Oct. 26, 1965     D. A. WILLIAMS     3,213,999
TRANSFER DEVICE FOR CONVEYOR INTERCHANGE
Filed Feb. 6, 1964     4 Sheets-Sheet 1

FIG. 1.

INVENTOR.
Donald A. Williams
BY
Harness, Dickey & Pierce
ATTORNEYS.

Oct. 26, 1965     D. A. WILLIAMS     3,213,999
TRANSFER DEVICE FOR CONVEYOR INTERCHANGE
Filed Feb. 6, 1964     4 Sheets-Sheet 3

INVENTOR.
Donald A. Williams,
BY
Harness, Dickey & Pierce
ATTORNEYS.

United States Patent Office 3,213,999
Patented Oct. 26, 1965

3,213,999
TRANSFER DEVICE FOR CONVEYOR INTERCHANGE
Donald A. Williams, Birmingham, Mich., assignor to The Cross Company, Fraser, Mich., a corporation of Michigan
Filed Feb. 6, 1964, Ser. No. 342,952
19 Claims. (Cl. 198—24)

This invention relates to work transfer devices primarily adapted and preeminently suited for transferring essentially heavy workpieces from one conveyor to another in a machine tool.

In automatic chucking machines of the type shown in the Cross Patent No. 2,745,167 dated May 15, 1956, for example, individual workpieces, each mounted on a suitable carrier or pallet, are moved progressively and in succession by a suitable automatic conveyor or transfer mechanism along a line of work stations where drilling, cutting or other operations are performed on the work. In the last station of the machine the work is removed from the pallet and the latter is transferred automatically to a conveyor which extends rearwardly at right angles to the line of work stations. This conveyor carries the pallet to a second conveyor which extends at right angles thereto and parallel to the line of work stations. A third conveyor arranged at right angles to the second conveyor and parallel to the first conveyor receives the pallets and carries them back to a loading station at the beginning of the line of work stations where a new workpiece to be processed is mounted thereon. The pallets are transferred automatically from one conveyor to another and to and from the line of work stations, and this invention is particularly concerned with the problem of transferring the pallets at these points and particularly at the conveyor interchanges. The pallets are moved along the conveyors by dogs on conveyor drive chains. Each dog releases its pallet at a conveyor interchange, and the timing of the conveyors is such that the pickup conveyor removes each pallet from the interchange before another pallet is pushed into the interchange by the delivery conveyor. From the foregoing it will be apparent that the pallets must be properly positioned and oriented in the conveyor interchanges relative to the ways of the pickup conveyor and for proper engagement by the chain dog of the pickup conveyor. Heretofore, difficulty has been experienced in positioning and orienting the pallets at the interchanges.

Various expedients have been proposed and tried in an effort to assure proper positioning of the pallets and to maintain uniformity of operation at the interchanges, but none have been completely successful. For example, fixed stops have been provided to limit movement of the pallets into the interchanges. However, the delivery conveyor obviously cannot push the pallet to a final position against a fixed stop because the chain dog has to release the pallet before it actually reaches the stop. Thus, if the pallet is to reach the stop, it must be pushed into the interchange with sufficient speed so that its forward momentum carries it to the stop after its release by the dog. It is not possible, however, for the pallet to just coast to the stop. It inevitably strikes with some force. This eventually results in damage both to the stop and to the pallet. Also, the pallet may rebound from the stop and sometimes it bounces back out of proper alignment with the pickup conveyor. The loaded pallets are not always uniform in weight and the amount of rebound varies considerably as a result of this factor alone. However, other conditions also affect the action of the pallets. For example, the presence on the conveyor ways of oil, coolant liquid or other materials always present on and around machine tools also is significant as it affects the coefficient of friction between the pallets and the ways. Further, if the pallets move on parallel ways, one way may be affected more than the other so that the pallet may not stop squarely in the interchange but is left in a cocked or skewed position. When this happens, the chain dog of the pickup conveyor does not engage the pallet properly or the latter will not enter the conveyor guides. As a result, a jam-up occurs and both the pallets and the conveyors usually are damaged. This, in turn, requires that the machine be shut down until repairs can be made, and this results in loss of production and sometimes disruption of the entire operation of the plant.

Efforts to absorb or soften the impact of the pallet as it strikes the stop by means of an air cylinder or a dashpot arrangement have not been satisfactory or significantly changed the basic problems involved.

While the workpiece herein referred to is mounted on a pallet, it will be readily appreciated that the invention is not necessarily limited to this particular arrangement. The work transfer device of this invention may well be adapted for use on machines other than chucking machines. Accordingly, the word "work" as used herein is intended to define either a workpiece per se or a workpiece mounted on a pallet, the pallet, per se, or indeed any object moved by a conveyor and transferred from one conveyor to another.

An important object of the present invention is to provide a work transfer device adapted for insertion between a delivery conveyor and a conveyor interchange that is operated automatically by the delivery conveyor to move the work into the interchange at a progressively reduced rate of speed which tapers off to zero so that the pallet is deposited accurately for proper engagement by the pickup conveyor without throw and rebound heretofore a characteristic of this apparatus.

Another object of the present invention is to provide a transfer device of the above mentioned character that can be adapted to serve in any capacity where it is necessary or desirable to place workpieces transferred from a conveyor accurately in a preselected position.

Still another object of the invention is to provide a transfer device of the above mentioned character that is mechanically simple in construction and efficient in operation so as to minimize possibility of mechanical failure and to eliminate insofar as possible the necessity of frequent servicing.

Other objects and advantages of the invention will be apparent during the course of the following description.

In the drawing, forming a part of this specification and wherein like numerals are employed to designate like parts throughout the same.

FIG. 3 is a transverse, vertical sectional view taken on the line 3—3 of FIG. 2;

In the drawing wherein, for the purpose of illustration, is shown a preferred embodiment of the invention, the numeral 10 designates the terminal portion of a delivery conveyor which, for the purpose of this application, can be considered to be the conveyor 28 of the Cross Patent No. 2,745,167. The numeral 12 designates the front end of a pickup conveyor which, for the purpose of this application, can be considered to be the conveyor 32 illustrated in the Cross patent. The numeral 14 designates a conveyor interchange in which work is deposited by the delivery conveyor 10 and from which it is taken by the pickup conveyor 12, and the interchange corresponds to the interchange 30 of the patented apparatus. It is to be understood in this connection that reference is made to the Cross patent only for the reason and to the extent that it provides an operative environment for the instant invention, because it illustrates a form of apparatus in which the problem which gave rise to this invention is particularly acute, and because it illustrates a complete machine of a type with which the instant invention is to be adapted for use. It will be readily appreciated, however, as suggested hereinabove, that the device of this invention is adapted and intended for use in any situation where it has utility and where its particular characteristics and mode of operation can be used to advantage.

The delivery conveyor 10 has a suitable supporting framework 15 and work 16, here shown by way of illustration in pallet form, is pushed along by the conveyor 10 on laterally spaced series of rollers 18 and 20. The series of rollers 18 is disposed between fixed supports 22 and 24 surmounting the framework 15 at one side thereof, and the other series of rollers 20 is disposed between fixed supports 26 and 28 at the other side of the supporting frame. Guides 30 and 32 mounted on the outer supports 22 and 28 confine the pallet 16 during its travel along the conveyor 10 and they also cooperate with the side edges of the pallet to hold the latter square on the conveyor at all times. Chain dogs 34 provided at suitably spaced intervals along the length of an endless drive chain 36, push pallet 16 on the supporting rolls 18 and 20. The chain 36 is trained around suitable sprockets according to conventional practice, and as hereinafter described, the upper flight of the drive chain is confined and supported by a channel 38 disposed between the inner roller supports 24 and 26. In normal operation, the pallets 16 come off the line at uniformly spaced intervals of time and are uniformly spaced apart. Similarly, the dogs 34 are spaced appropriately on the chain 36 and the speed of the latter is such that a dog 34 moves into operative position to engage a pallet each time a pallet is delivered to the conveyor.

At the discharge end of the conveyor 10, the drive chain 36 passes around a drive sprocket 40 which is set well ahead of the rest of the conveyor. As shown, the sprocket 40 is fixed on a drive shaft 42 which extends transversely of the conveyor and is journaled in suitable bearings 44 and 46 (FIG. 3) on one end of a suitable supporting framework which conveniently can be part of the interchange 14. The shaft 42 extends laterally beyond the bearing 46 and a sprocket 48 fixed on the projecting end thereof is connected by an endless chain 50 to a sprocket 52 on the drive shaft 54 of a right angle drive unit 56.

The pickup conveyor 12 similarly comprises a laterally spaced series of rollers 58 and 60 supported by and disposed at opposite sides of a suitable framework 61. As perhaps best shown in FIG. 1, the rollers 58 are disposed between inner and outer supports 62 and 64, and the rollers 60 are disposed between inner and outer supports 66 and 68. Guides 70 and 72 mounted on the outer supports 64 and 68 confine the pallets 16 during travel thereof along the conveyor 12 and hold the pallets squarely on the conveyor at all times. The conveyor 12 is similarly equipped with a drive chain 74, and the upper run thereof extends longitudinally of the conveyor substantially midway between the rollers 58 and 60 and in a suitable channel member 76. In this instance, the drive chain 74 extends through the interchange 14 at right angles to the conveyor 10 and is trained around a drive sprocket 78 behind the interchange and within the housing 79, as shown in FIGURE 3. The shaft 80 which carries the drive sprocket 78 also carries a sprocket 82 that is connected by an endless chain 84 to a sprocket 86 on a second drive shaft 88 of the right angle drive unit 56. Dogs 90 are provided on the conveyor chain 74 in the same manner and for the same purpose as on a drive chain of the delivery conveyor 10. After a pallet 16 has been deposited in the interchange 14, one of the dogs 90 engages the pallet and pushes it onto the pickup conveyor 12 for transportation away from the interchange.

The interchange 14 comprises a supporting framework 91 having laterally spaced parallel ways 92 and 94 disposed in the same horizontal plane as and in alignment with the series of rollers 18 and 20 of the delivery conveyor 10, and it also has right angularly disposed ways 96 and 98 disposed in coplanar relation with the ways 92 and 94 in the same horizontal plane and in longitudinal alignment with the sets of rollers 58 and 60 of the pickup conveyor 12.

Relatively short rails 100 and 102 extending between the delivery conveyor 10 and the interchange 14 and suitably mounted on the supporting structures 15 and 91 thereof carry ways 104 and 106 which overlay the drive unit and bridge the space between the conveyor rollers 18 and 20 and the interchange ways 92 and 94. As the ways 104 and 106 are disposed in the same horizontal plane as the rollers 18 and 20 and the ways 92 and 94, pallets delivered by the conveyor 10 move smoothly and uninterruptedly across the ways 104 and 106 and onto the interchange 14. A rail or abutment 107 at the far side of the interchange 14 from the delivery conveyor 10 limits travel of the pallet 16 into the interchange and guides pallet 16 onto pickup conveyor 12.

The transfer device of this invention is located in the space between the delivery conveyor 10 and the interchange 14 and is actuated directly by the drive chain 36 of the delivery conveyor after the pallet is released by the dog 34 to complete the transfer of the pallet into the interchange. It moves the pallet across the bridging ways 104 and 106 and to a final position in the interchange 14 at a gradually reduced rate of speed and, by reason of the fact that the rate of travel of the pallet 16 into the interchange is reduced gradually by the transfer device, it is not necessary to "throw" the pallet into the interchange as heretofore and any tendency for the pallet to rebound therefore is minimized. Also, because the rate of forward movement of the pallet 16 diminishes to zero as it reaches the final position in the interchange and, inasmuch as the total weight of the pallet and the workpiece carried thereby usually is quite heavy, there is less tendency for the pellet to coast after it is released by the transfer device. It simply moves to the final position and is retained squarely in alignment with the rollways 58 and 60 and guides 70 and 72 of the pickup conveyor 12. Moreover, inasmuch as the transfer device is actuated directly by the delivery conveyor 10, the timing of the transfer operation can be readily coordinated with the operation of the pickup conveyor 12 so that the pallet 16 arrives in the interchange 14 just ahead of one of the dogs on the drive chain 74 of the pickup conveyor. As a consequence, the pallet 16 is pushed out of the interchange 14 onto the pickup conveyor 12 promptly after it arrives in the interchange so as to clear the latter for the arrival of the next pallet from the delivery conveyor 10.

Figure 1:
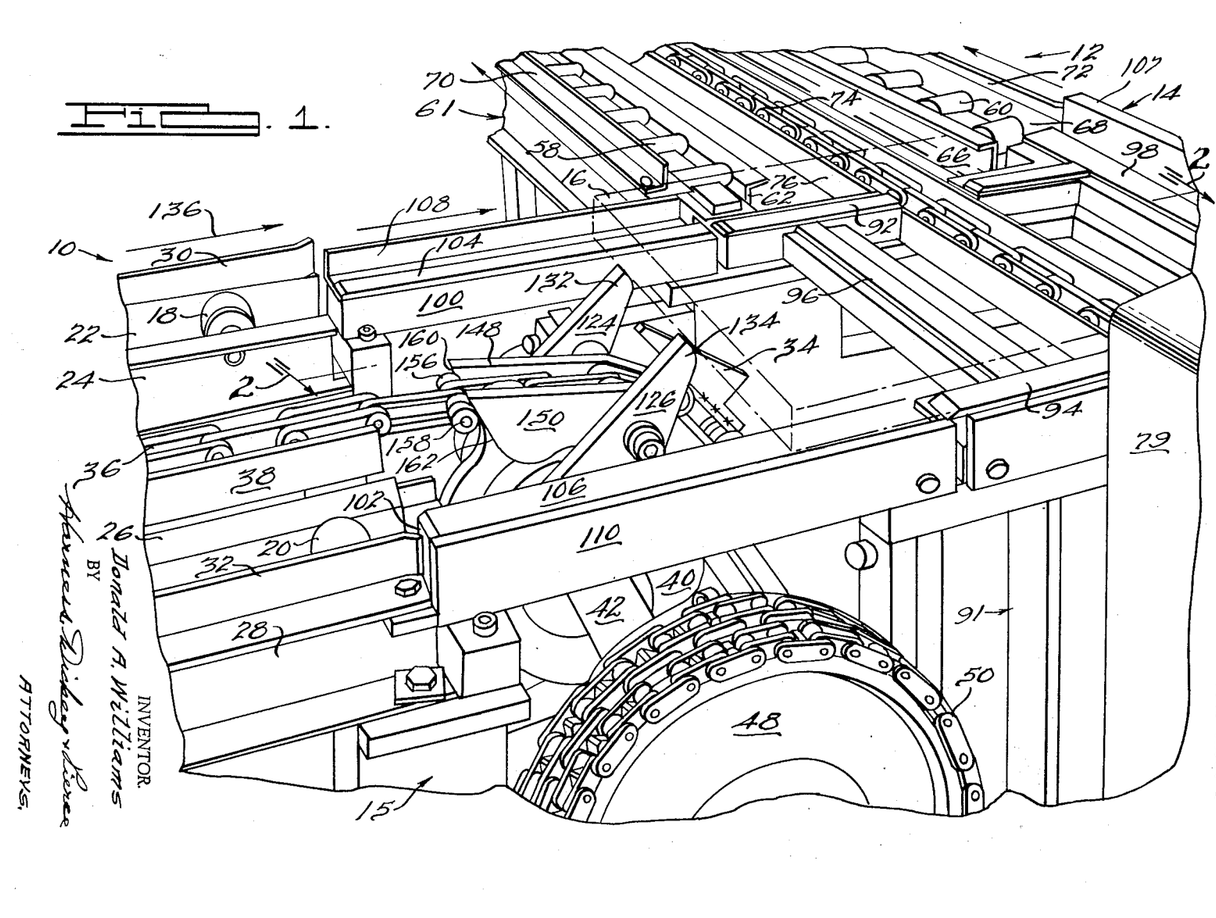
FIG. 1 is a fragmentary perspective view showing a work transfer device embodying the instant invention between the discharge end of a delivery conveyor and a conveyor interchange and the latter in operative association with a pickup conveyor.

Specifically, the transfer device comprises a pair of spaced, parallel, upright supports 112 and 114 disposed just ahead of the conveyor drive unit; viz., between the drive shaft 42 and the interchange 14. The lower ends of the supports 112 and 114 are pivotally connected by a mounting bracket 116 to a cross member 118 of the frame 91, and a spacer 120 between the pivoted ends of the supports holds the latter fixedly apart. As perhaps best shown in FIGURE 3, the supports 112 and 114 extend upwardly on opposite sides of the conveyor chain 36 and its driving pulley 40, and pusher dogs 124 and 126 are pivotally attached to the upper ends of the supports at the outer sides thereof. Weights 128 and 130 on the rearward ends of the pusher dogs hold them normally positioned as shown in FIGURE 1 with the forward ends 132 and 134 thereof extending above the bridging ways 104 and 106 and in the path of travel of the pallets 16 as they move from the delivery conveyor 10 to the interchange 14. In this connection it will be observed that the weights 128 and 130 are wider than the pusher dogs 124 and 126 (FIG. 3) so that they normally bear on supports 112 and 114 to hold the pusher dogs inclined forwardly and upwardly as shown in FIGURE 1.

Figure 2:
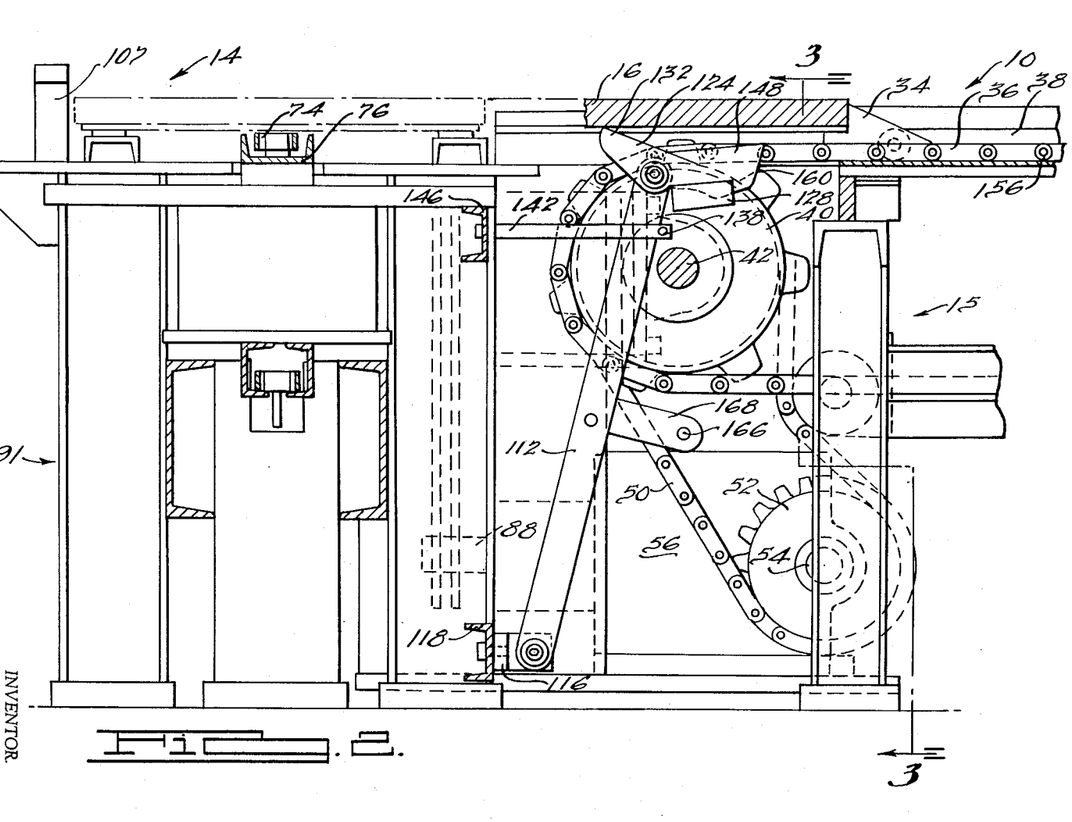
FIG. 2 is a vertical sectional view taken on the line 2—2 of FIG. 1.

Pallets 16 delivered by the conveyor 10 moves in the direction of the arrow 136; and, as the leading edge of each pallet traverses the bridging ways 104 and 106, it engages the upwardly projecting forward end portions 132 and 134 of the pusher dogs 124 and 126 and pivots or rocks them downwardly to a position below the pallet as shown in FIGURE 2. Thus, as the chain dog 34 shoves the pallet 16 across the ways 104 and 106 and into the interchange 14, the pallet overrides the pusher dogs 124 and 126.

In connection with the foregoing, it is significant also that the weights 128 and 130 and other parts of the transfer device overbalance the latter in a rearward direction to hold the same normally in the position shown in FIG. 2 with the supports 112 and 114 against stops 138 and 140 which are carried by brackets 142 and 144 mounted on a cross member 146 of the frame 91. When the transfer device is inclined rearwardly against the stops 138 and 140, the chain dog 34 shoves the pallet 16 entirely over the pusher dogs 124 and 126 and approximately to the position shown in FIG. 4. The chain dog 34 of course continues to shove the pallet 16 until it begins to move downwardly around the drive sprocket 40. However, by this time the rearward or trailing edge of the pallet 16 has cleared the pusher dogs 124 and 126 so that the latter pivot upwardly to the normal position with the forward ends 132 and 134 thereof positioned to engage the rear edge of the pallet.

As suggested, the chain dog 34 shoves the pallet 16 part way into the interchange 14, but it does not push the pallet to a final position in the interchange. Final movement of the pallet 16 into the interchange 14 is effected by a pair of cams 148 and 150 which are identical in size and shape and which extend rearwardly from the supports 112 and 114 on opposite sides of the conveyor drive chain 36. If necessary, the cams 148 and 150 can be suitably spaced from the supports 112 and 114 by the spacers 152 and 154 to position them properly with respect to the drive chain 36 and for engagement by cam followers or rollers 156 and 158 on the chain. The rollers 156 and 158 conveniently can be mounted on one of the pivots which connect adjacent links of the drive chain 36, and at opposite sides of the chain and a pair of rollers is disposed a suitable distance behind each chain dog 34.

From the foregoing, it will be readily apparent that the spacing between each pair of rollers 156 and 158 and its respective chain dog 34 is such that the rollers move into engagement with the transfer cams 148 and 150 almost immediately after the dog releases the pallet 16 and after the pusher dogs 124 and 126 have rocked upwardly behind the trailing edge of the pallet. By reason of the spacing between the chain dog 34 and the cam follower rollers 156 and 158, the latter are disposed a considerable distance behind the axis of the drive sprocket 40 at the time the dog 34 begins to move downwardly around the forward half of the drive sprocket 40, so that the rollers still have a considerable forward horizontal travel before they too begin to move around the sprocket.

According to the present invention, the travel of the rollers 158 and 156 last referred to is utilized to actuate the transfer device to shove the pallet 16 to a final position in the interchange 14. To this end the cams 148 and 150 are formed with rearwardly facing profiles 160 and 162 disposed for engagement by the follower rollers 156 and 158, respectively. When the rollers 156 and 158 first engage the cams 158 and 150, the transfer device is in the position shown in FIG. 4 and, as the rollers move forwardly toward the drive sprocket 40, they push against the cams to rock the transfer device forwardly in the direction of the arrow 164 in FIGURE 4. Further, the rollers 156 and 158 continue to push against the cams 148 and 150 until the transfer device is in the fully advanced, nearly upright position shown in FIG. 5. As the transfer device moves from one position to the other, the rollers 156 and 158 traverse the cam profiles 160 and 162 and the pusher dogs 124 and 126 move first into engagement with and then push the pallet 16 to a final position in the interchange 14. The contour or shape of the cam profiles 160 and 162 is such that the forward motion of the transfer device and accordingly of the pallet 16 occurs at a gradually diminishing rate; and, by the time the rollers 156 and 158 begin to move around the drive sprocket 40, they move under the cams 148 and 150 and finally release them all together. By properly contouring the cams 148 and 150 it is possible to attenuate the forward motion of the pallet 16 so that it gradually approaches and ultimately reaches zero speed at the time the rollers disengage the cams. In this manner the pallet 16 is eased into the interchange 14. Moreover, the contours of the cams 148 and 150 are such that the rollers 156 and 158 remain in contact with the cams 148 and 150 for an interval of time after the pusher dogs 124 and 126 reach the extreme forward limits of travel. This dwell period holds the pallet 16 positioned properly in the interchange 14 and maintains it in this position regardless of any coacting or rebound that may occur. As a consequence, the pallet 16 is left in an accurate final position in the interchange 14 and precisely in alignment with the ways 58 and 60 of the pickup conveyor 12.

As suggested, the transfer device is over-weighted in a rearward direction so that it normally falls back by gravity to its normal position against the stops 138 and 140 (FIG. 4) as soon as the cams 148 and 150 are released by the follower. However, in the event the transfer device sticks or remains balanced for some reason in the forward position, provision is made for returning it to the normal rearwardly inclined position after each operation thereof.

Figures 4, 5, 6, 7:
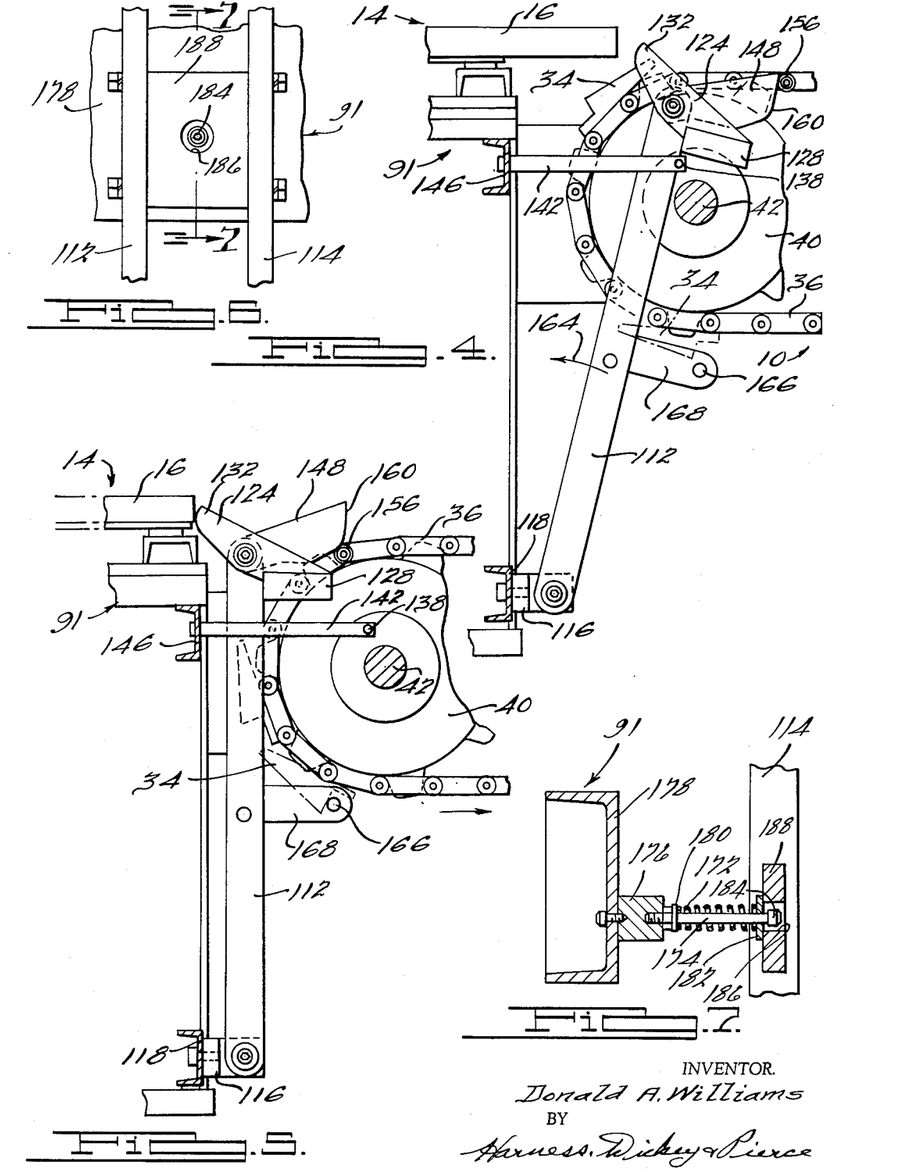
FIG. 4 is a view similar to FIG. 2 but showing only the work transfer device and fragmentary portions of the delivery conveyor and the conveyor interchange and illustrating the transfer device in the fully retracted position which it normally occupies preparatory to moving work from the conveyor into the interchange.
FIG. 5 is a view similar to FIG. 4 but illustrating the transfer device in the fully advanced position which it occupies after moving the work into the interchange.
FIG. 6 is a fragmentary elevational view showing a modified form of the transfer device.
FIG. 7 is a vertical sectional view taken on the line 7—7 of FIG. 6.

One means for assuring the return of the transfer device is shown in FIGURES 6 and 7. In this form of the invention, a compression spring 172 is provided around a stud 174 which is threaded into a mounting block 176 on a cross member 178 of the supporting structure 91. The spring 72 is seated at one end on a washer 180 at the base of the stud 174 and at the other end on a washer 182 behind the head 184 of the stud. When the transfer device is in the fully advanced or upright position, the head 184 of the stud 174 extends into an opening 186 in a cross member 188 disposed between and connected to the supports 112 and 114 as shown in FIGURE 7. The opening 186 accepts the stud 174 and the cross member 188 engages the end washer 182 as the supports 112 and 114 move to the fully advanced position and this action causes the washer 182 to move away from the head 184 as shown in the drawing and to compress the spring 172. Thus, when the transfer device is released by the conveyor rollers 156, the spring 172 expands and gives the transfer device an initial push which causes it to fall back to its normal retracted position. Because of the overweighted condition of the transfer device in the direction of the retracted position, a slight push normally is sufficient to assure its return after each operation.

In some instances, however, it may be desirable to assure the positive return of the transfer device and such a means is shown in FIGURES 1–5. In this form of the invention, an abutment bar 166 carried by brackets 168 and 170 on and extending rearwardly from the supports 112 and 116 is positioned to be in the path of travel of the chain dog 34 immediately preceding the cam follower rollers 156 and 158 (FIG. 5) when the transfer device is in the forward upright position and to be clear of the chain dog when the transfer device is in the rearward inclined position. In practice, the chain dog 34 reaches the abutment 166 shortly after the rollers 156 and 158 release the cams 148 and 150 and, of course, after the pallet 16 has been pushed to the final position in the interchange 14. Manifestly, if the transfer device falls back to its normal position after the tranfer operation, the dog 34 simply moves on around the drive sprocket 40 and along the return lower run or reach of the conveyor 36 without effect. However, if the transfer device remains in the forward upright position for some reason, the chain dog 34 engages the abutment 166 and pushes the transfer device back to the normal retracted position. Manifestly, as the transfer device falls back in the manner described, the abutment 166 moves to a position below the chain dog 34 so that there is no possibility of interference between these members.

From the foregoing it will be readily apparent that the transfer device hereinabove described achieves the objects of the invention. It is operated automatically by the delivery conveyor 10 to move the pallet 16 into the interchange 14 at a progressively reduced rate of speed which tapers off to zero so that the pallet is deposited accurately for proper engagement by the pickup conveyor 12 and to hold the pallet for a short interval sufficient to control any throw or rebound of the pallet that may occur. Moreover, the transfer device is mechanically simple in construction and efficient in operation so as to minimize the possibility of mechanical failure and to eliminate insofar as possible the necessity of frequent servicing.

What is claimed is:

1. In a conveyor system of the type having a work interchange, a delivery conveyor including an endless drive chain movable around a sprocket located adjacent to said interchange and equipped with dogs engageable behind work on the conveyor operable to shove the same along the conveyor to said interchange and until said work is released by said dogs as the latter move with the chain around said sprocket, and a pickup conveyor extending from said interchange at an angle to said delivery conveyor and adapted to engage and remove from said interchange work deposited by said delivery conveyor, the improvement comprising a transfer device at the end of said delivery conveyor for moving work at a reduced rate into said interchange and for depositing and orienting said work properly for engagement by said pickup conveyor, said transfer device having a pivoted support mounted or rocking movement between retracted and advanced positions and being normally in a retracted position, pusher dogs on said support disposed for overriding engagement by said work as the latter is shoved to a final position by the chain dogs of said delivery conveyor and adapted to engage behind said work before the latter is released by said chain dogs, cam means on said support adjacent to said conveyor chain; and cam follower means on and movable with said conveyor chain behind said chain dogs engageable with said cam means after release of said work by said chain dogs to rock said support forwardly to the advanced position at a reduced rate, whereby said pusher dogs push said work to a final position in said interchange and in proper position for engagement by said pickup conveyor.

2. The combination as set forth in claim 1 wherein the cam profiles of said cam means are contoured to move said work into said interchange at a progressively reduced rate of speed.

3. The combination as set forth in claim 1 including means for restraining and controlling said work in said interchange after release thereof by said transfer device.

4. The combination as set forth in claim 1 including means coactive with said delivery conveyor for holding said pusher dogs in the extreme forward postion for a limited dwell period after release of said work by said pusher dogs.

5. The combination as set forth in claim 1 wherein the profiles of said cam means are contoured to maintain engagement with said cam follower means for a brief but sustained period of time after said support reaches the fully advanced position whereby to control the position of said work after release thereof by said pusher dogs.

6. In a conveyor system of the type having a work interchange, a delivery conveyor including an endless drive chain movable around a sprocket located adjacent to said interchange and equipped with dogs engageable behind work on the conveyor and operable to shove the same along the conveyor to said interchange until said work is released by said dogs as the latter move with the chain around said sprockets, and a pickup conveyor extending from said interchange at an angle to said delivery conveyor and adapted to engage and remove from said interchange work deposited by said delivery conveyor, the improvement comprising a transfer device at the end of said delivery conveyor for moving work at a reduced rate into said interchange and for depositing and orienting said work properly for engagement by said pickup conveyor, said transfer device having a normally retracted rocker arm at the end of said delivery conveyor movable in the direction of said interchange, pusher dogs on said rocker arm disposed for overriding engagement by said work as the latter is shoved to a final position by the chain dogs of said delivery conveyor and adapted to engage behind said work before the latter is released by said chain dogs, cam means on said rocker arm;

cam follower means on and movable with said conveyor chain engageable with said cam means after release of said work by said chain dogs to advance said rocker arm at a reduced rate, whereby said pusher dogs push said work to a final position in said interchange and in proper position for engagement by said pickup conveyor; and means on said delivery conveyor engageable with said transfer device when said rocker arm is in the advance position and operable to move said arm to its normal retracted position.

7. In a conveyor system of the type having a work interchange, a delivery conveyor including an endless drive chain movable around a sprocket adjacent to said interchange and equipped with dogs engageable behind work on the conveyor and operable to shove the same along said conveyor to said interchange until they release said work as they move around said sprocket, and a pickup conveyor extending from said interchange adapted to engage and remove from said interchange work deposited by said delivery conveyor, the improvement comprising a transfer device at the end of said delivery conveyor for moving work at a reduced rate into said interchange and for depositing and orienting said work properly for engagement by said pickup conveyor, said transfer device having a pivoted support mounted for rocking movement between retracted and advanced positions and normally in a retracted position, pusher dogs on said support disposed for overriding engagement by said work as the latter is shoved to a final position by a chain dog on said delivery conveyor and adapted to engage behind said work before the latter is released by said chain dog, and cam means also on said support adjacent to said conveyor chain;

cam follower means on and movable with said conveyor chain engageable with said cam means after release of said work by said chain dog to rock said support forwardly at a reduced rate, whereby said pusher dogs push said work to a final position in said interchange and in proper position for engagement by said pickup conveyor; and abutment means on said pivoted support disposed in the path of travel of said chain dogs when the support is in the advance position and out of the path of travel of said chain dogs when the support is in the retracted position, said abutment means being engageable by a chain dog if the support remains in the advance position after a transfer operation and being movable by said chain dog to return said support to the retracted position.

8. In a conveyor system of a type having a work interchange, a delivery conveyor including a drive chain and means for moving work on the conveyor at least partially into said interchange, and a pickup conveyor adapted to engage and remove work from said interchange, the improvement comprising a transfer device at the end of said delivery conveyor for moving work at a reduced rate into said interchange and for positioning and orienting work properly for engagement by said pickup conveyor, said transfer device having a pivoted support mounted for rocking movement between retracted and advanced positions and normally in retracted position, pusher dogs on said support disposed for overriding engagement by said work as the latter is moved to a final position by said delivery conveyor and adapted to engage behind said work, cam means on said support adjacent to said conveyor chain; and cam follower means on and movable with said conveyor chain engageable with said cam means to rock said support forwardly to the advanced position at a reduced rate, whereby said pusher dogs push said work to a final position in said interchange and in proper position for engagement by said pickup conveyor.

9. In a conveyor system of a type having a work interchange, a delivery conveyor including an endless drive chain, and means for moving work on the conveyor at least partially into said interchange, and a pickup conveyor adapted to engage and remove work from said interchange, the improvement comprising a transfer device at the end of said delivery conveyor for moving work at a reduced rate into said interchange and for positioning and orienting said work properly for engagement by said pickup conveyor, said transfer device having a pivoted support mounted for rocking movement between retracted and advanced positions and normally in retracted position, pusher dogs on said support disposed for overriding engagement by said work as the latter is moved to a final position by said delivery conveyor and adapted to engage behind said work, cam means on said support adjacent to said conveyor chain;

cam follower means on and movable with said conveyor chain engageable with said cam means to rock said support forwardly to the advanced position at a reduced rate, whereby said pusher dogs push said work to a final position in said interchange and properly for engagement by said pickup conveyor; and means on the drive chain of said delivery conveyor for moving said pivoted support from the advanced to the retracted position.

10. In a conveyor system of the type having a work interchange, a delivery conveyor including a drive chain, and means for moving work on the conveyor into said interchange, and a pickup conveyor adapted to engage and remove work from said interchange, the improvement comprising a transfer device at the end of said delivery conveyor for moving work at a reduced rate into said interchange and for depositing and orienting said work properly for engagement by said pickup conveyor, said transfer device having a pivoted support mounted for rocking movement between a retracted position adjacent to said delivery conveyor and an advance postion adjacent to said interchange, means on said support engageable with work deposited in said interchange by said delivery conveyor, cam means on said support adjacent to the drive chain of said delivery conveyor; and cam follower means on and movable with said conveyor chain engageable with said cam means to rock said support forwardly to the advanced position at a reduced rate, whereby the work engaging means of said transfer device push said work to a final position in said interchange and in proper position for engagement by said pickup conveyor.

11. The combination as set forth in claim 10 wherein said cam means and said cam follower means are operative to hold said work against rebound in said interchange after being pushed into said interchange by said transfer device.

12. In a conveyor system of the type having a work interchange, a delivery conveyor including a drive chain and means for moving work on the conveyor into said interchange, a pickup conveyor adapted to engage and remove work from said interchange, the improvement comprising a transfer device at the end of said delivery conveyor for moving work at a reduced rate into said interchange and for depositing and orienting said work properly for engagement by said pickup conveyor, said transfer device having a pivoted support movable between a retracted substantially vertical position and an advanced position inclined toward said delivery conveyor, said support being overbalanced in the direction of said delivery conveyor whereby normally to occupy the retracted positon, work engaging means on said support engageable with work delivered in said interchange by said delivery conveyor and operable to move the work farther into said interchange when said support is rocked from retracted position to said advanced position, cam means on said support; and cam follower means on the drive chain of said delivery conveyor engageable with said cam means to rock said support from said retracted position to said advanced position, the cam profiles of said cam means being contoured to move said work into said interchange at a progressively reduced rate of speed.

13. In a conveyor system of the type having work supporting means and a delivery conveyor having an endless drive chain movable around an end sprocket located adjacent to said work supporting means and equipped with dogs engageable behind work on the conveyor and operable to shove the same along the conveyor toward said work supporting means and until said work is released by said dogs as the latter move with the chain around said sprocket, the improvement comprising a transfer device at the end of said delivery conveyor for moving work at a reduced rate of speed onto said work supporting means and for depositiong and orienting said work accurately in a predetermined position on said work supporting means, said transfer device having a pivoted rocker arm movable between retracted and advanced positions and normally in retracted position, pusher dogs on said rocker arms disposed for overriding engagement by said work as the latter is shoved to a final position on said work supporting means by a chain dog of said delivery conveyor and adapted to engage behind said work before the latter is released by said chain dog, cam means on said rocker arms adjacent to said conveyor chain; and cam follower means on and movable with said conveyor chain behind said chain dog engageable with said cam means after release of said work by said chain dog to move said rocker arms forwardly to the advance position at a reduced rate, whereby said pusher dogs push said work accurately to a final position on said work supporting means, the cam profiles of said cam means being contoured to move said work at a progressively reduced rate of speed to a final predetermined position in said station.

14. In a conveyor system of the type having a work station, and a delivery conveyor having a drive chain and adapted to move work to said work station, the improvement comprising a transfer device at the end of said delivery conveyor and between the latter and said station for moving work at a reduced rate into said station and for depositing said work accurately in predetermined position in said station, said transfer device having a pivoted support mounted for rocking movement between a retracted and an advanced position, means on said support engageable with work delivered to said station by said delivery conveyor and operable to push said work to a final position in said station when said support is moved from the retracted postion to the advanced position, cam means on said support adjacent to said conveyor chain; and cam follower means on said drive chain engageable with said cam means to rock said support forwardly to the advance position, said cam and said cam follower means moving said work at a slower rate than said delivery conveyor and at a progressively reduced rate, whereby said work is deposited accurately in a predetermined position in said station.

15. In combination,
a work station;
a delivery conveyor for moving work to said station; and
a transfer device between said delivery conveyor and said station for depositing said work accurately in a predetermined position in said station, said transfer device having a pivoted support movable between a retracted position adjacent to said delivery conveyor and an advance position adjacent to said station, means for normally positioning said support in the retracted position, pusher dogs on said support disposed for overriding engagement by said work as the latter is moved to said station by said delivery conveyor and adapted to engage behind said work, and cam means on said support,
said delivery conveyor having
a drive chain equipped with cam follower means engageable with said cam means to move said support to the advanced position, the cam profiles of said cam means being contoured to move said work into said station at a progressively reduced rate of speed, whereby to deposit the work accurately in a predetermined position in said station.

16. In combination,
a work station;
a delivery conveyor for moving work to said station; and
a transfer device between said delivery conveyor and said station for depositing said work accurately in a predetermined position in said station, said transfer device having a support movable between a retracted position adjacent to said delivery conveyor and an advance position adjacent to said station, means for normally positioning said support in the retracted position, means on said support engageable with work delivered to said station by said conveyor and operative to push the work to a final position in said station when said support is moved from the retracted position to the advanced position, cam means on said support, and
cam follower means on and movable with said delivery conveyor engageable with said cam means to push said support from a retracted position to an advance position at a progressively reduced rate of speed, whereby said work is deposited by said transfer device accurately in a predetermined position in said station.

17. In combination,
a work station;
a delivery conveyor for moving work to said station; and
a transfer device between said delivery conveyor and said station for depositing said work accurately in a predetermined position in said station, said transfer device having a support mounted for rocking movement between a first position inclined toward said delivery conveyor and a second substantially vertical position adjacent to said station, means on said support engageable with work delivered to said station by said conveyor for moving work to a final position in said station as said support is rocked from said first position to said second position, cam means on said support, said conveyor having a drive chain equipped with
cam follower means engageable with said cam means after the work has been delivered to said transfer device and said station by said conveyor, said cam means and said cam follower means being operative to move said support from said first position to said second position at a progressively reduced rate, whereby said work is deposited in said station accurately in a predetermined position.

18. In combination,
a work station,
a delivery conveyor for moving work to said station, and
a transfer device between said delivery conveyor and said station for depositing said work accurately in a predetermined position in said station, said transfer device having a support mounted for rocking movement between a first position inclined in the direction of said delivery conveyor and a second substantially vertical position adjacent to said station, means on said support engageable with work delivered to said station by said conveyor for moving work to a final position in said station as said support is rocked from said first position to said second position, cam means on said support, said conveyor having a drive chain equipped with cam follower means engageable with said cam means after the work has been delivered to said transfer device and said station by said conveyor, said cam means and said cam follower means being operative to move said support from said first position to said second position at a progressively reduced rate whereby said work is deposited in said station accurately in a predetermined position, abutment means on said support, and means on said conveyor chain engageable with said abutment means when the support is in said second mentioned position and operative by such engagement to retract said support to the first mentioned position.

19. In combination,
a work station,
a delivery conveyor for moving work to said station, and
a transfer device between said delivery conveyor and said station for depositing said work accurately in a predetermined position in said station, said transfer device having a support mounted for rocking movement between a first position inclined in the direction of said delivery conveyor and a second substantially upright position adjacent to said station, means on said support engageable with work delivered to said station by said conveyor for moving said work to a final position in said station as said support is rocked from said first position to said second position, cam means on said support, said conveyor having a drive chain equipped with cam follower means engageable with said cam means after the work has been delivered to said transfer device and said station by said conveyor, said cam means and said cam follower means being operative to move said support from said first position to said second position at a progressively reduced rate, whereby said work is deposited in said station accurately in a predetermined position, said support being overbalanced in the direction of said conveyor whereby to return automatically to said first mentioned position after release of said cam means by said cam follower means.

References Cited by the Examiner
UNITED STATES PATENTS
2,950,804   8/60   Ardner _________________ 198—24

SAMUEL F. COLEMAN, *Primary Examiner.*